US010747459B2

(12) United States Patent
Ruccia

(10) Patent No.: US 10,747,459 B2
(45) Date of Patent: Aug. 18, 2020

(54) MEDIA STORAGE DEVICE INCLUDING MULTIPLE PARTITIONS

(71) Applicant: URFLASH LLC, Chicago, IL (US)

(72) Inventor: Robert Ruccia, Harrisburg, IL (US)

(73) Assignee: URFLASH LLC, Chicago, IL (US)

( * ) Notice: Subject to any disclaimer, the term of this patent is extended or adjusted under 35 U.S.C. 154(b) by 0 days.

(21) Appl. No.: 16/172,281

(22) Filed: Oct. 26, 2018

(65) Prior Publication Data

US 2019/0129645 A1    May 2, 2019

Related U.S. Application Data

(60) Provisional application No. 62/577,518, filed on Oct. 26, 2017.

(51) Int. Cl.
*G06F 3/06* (2006.01)
*G06F 12/02* (2006.01)

(52) U.S. Cl.
CPC .......... *G06F 3/0644* (2013.01); *G06F 3/0605* (2013.01); *G06F 3/0607* (2013.01); *G06F 3/0661* (2013.01); *G06F 3/0679* (2013.01); *G06F 12/0246* (2013.01)

(58) Field of Classification Search
CPC .... G06F 3/0605; G06F 3/0607; G06F 3/0644; G06F 3/0661; G06F 3/0679; G06F 12/0246
See application file for complete search history.

(56) References Cited

U.S. PATENT DOCUMENTS

| | | | |
|---|---|---|---|
| 5,630,093 A * | 5/1997 | Holzhammer | G06F 3/0601 711/115 |
| 7,111,121 B2 | 9/2006 | Oishi et al. | |
| 7,383,386 B1 | 6/2008 | Iyer et al. | |
| 7,930,531 B2 | 4/2011 | Chow et al. | |
| 8,156,086 B2 * | 4/2012 | Lu | G06F 11/1448 707/690 |
| 8,312,247 B2 | 11/2012 | Honda | |
| 9,176,745 B2 | 11/2015 | Shirota et al. | |

(Continued)

FOREIGN PATENT DOCUMENTS

| | | |
|---|---|---|
| CN | 101403997 | 4/2009 |
| KR | 20150069311 | 6/2015 |
| KR | 20160091972 | 8/2016 |

OTHER PUBLICATIONS

International Preliminary Report on Patentability filed in PCT/US2018/057825, dated Apr. 28, 2020; 6 pages.

*Primary Examiner* — Eric T Oberly
(74) *Attorney, Agent, or Firm* — Vedder Price P.C.

(57) ABSTRACT

Methods and devices for enabling compatibility of media storage devices with a wide range of external devices are generally provided herein. More specifically, methods and devices disclosed herein allow a single media storage device to be accessed by external devices that are incapable of accesses the same file structure(s) and/or file type(s). A media storage device may include a plurality of logical units, each with one or more partitions. A file system on a first partition of a first logical unit may be selected for compatibility with one external device, while a file system on a second partition of a second logical unit may be selected for compatibility with a second, different external device. The media storage device may present as a fixed disc for further interoperability.

11 Claims, 3 Drawing Sheets

(56) References Cited

U.S. PATENT DOCUMENTS

| | | |
|---|---|---|
| 9,582,444 B1 | 2/2017 | Kumar et al. |
| 9,846,544 B1 * | 12/2017 | Bassov ................ G06F 3/0617 |
| 9,983,810 B2 * | 5/2018 | Reddy CH ............ G06F 3/0619 |
| 2005/0114291 A1 | 5/2005 | Becker-Szendy et al. |
| 2006/0161725 A1 | 7/2006 | Lee et al. |
| 2006/0265567 A1 | 11/2006 | Ji |
| 2008/0052461 A1 | 2/2008 | Kavian |
| 2012/0016840 A1 * | 1/2012 | Lin .................... G06F 11/2097 707/626 |
| 2012/0084529 A1 | 4/2012 | Nonaka et al. |
| 2016/0004721 A1 * | 1/2016 | Iyer ...................... G06F 16/128 707/649 |
| 2017/0116131 A1 | 4/2017 | Lin |

* cited by examiner

MEDIA STORAGE DEVICE INCLUDING MULTIPLE PARTITIONS

CROSS-REFERENCE TO RELATED APPLICATIONS

This application claims the benefit of and priority from U.S. Provisional Application Ser. No. 62/577,518, filed on Oct. 26, 2017, the contents of which are hereby fully incorporated herein by reference in their entirety.

FIELD OF THE INVENTION

The present invention generally relates to removable storage media and methods of authoring the same, and more specifically relates to methods for authoring removable storage media for cross-platform compatibility.

BACKGROUND

Conventionally, digital content is distributed using optical media (e.g., compact discs, digital video discs, etc.). However, such optical media can only be accessed by specific devices with suitable disc drives, which are increasingly absent from consumer electronic devices, limiting the ability of content providers to distribute media to consumers in physical form.

While portable hard drives exist, such technology is generally only compatible with a limited number of electronic devices. Further, while Internet delivery of media has been used in some cases, this mode of delivery often sacrifices quality and security or requires Internet connectivity that is not present in all electronic devices.

Different types of file formats are used for different types of media and electronic devices can typically only access limited subsets of these file formats. As the numbers and types of file formats increase, along with different file structures used to execute the different file formats, storage of files on media that can interact with multiple different file structures becomes increasingly difficult. Different media storage devices are formatted to different file structures to allow for interactions with different devices. This creates difficulties in the portability and management of the different media devices. In particular, media devices formatted to work with one device (such as a computer) are often incompatible with other devices (such as a game system or "smart" television). Additionally, often compatibility issues exist between media devices of a single type (such as a computer running a Windows operating system and a computer running a Macintosh operating system).

As the size of media storage unit has increased, the types and sizes of files stored in the memory of a media storage device has grown. Video and audio files typically have a large size and have not historically been stored on media storage devices due to their size. With the increase in storage capacity of media storage devices, video and audio files can now be stored on portable media storage devices. However, as many different devices execute video and audio files, a need exists for a single media storage unit capable of interacting with a number of different external devices.

SUMMARY

Described herein are various embodiments of a media storage unit including a microcontroller in communication with a memory having a plurality of memory locations, wherein the microcontroller formats groups of the plurality of memory locations into a predetermined file structure. The media storage unit is configured so as to be compatible with a wide range of devices, allowing for content stored on the media storage unit to be seamlessly accessed by multiple devices.

Embodiments described herein provide a method for authoring a media device comprising a non-volatile memory communicatively coupled to a microcontroller to be compatible with a plurality of external devices, each of a different type, the method comprising the steps of: determining a set of files to be written to the media; preparing the set of files to be written to the media device; setting the microcontroller to present the memory as a fixed disk when the media device is connected to one of the plurality of external devices; formatting the memory to contain a plurality of logical units, including at least a first logical unit; setting the microcontroller to allow read/write access to the plurality of logical units; formatting each of the plurality of logical units to contain one or more partitions, including at least a first partition on the first logical unit; creating a copy of the set of files in at least the first partition of the first logical unit; setting the microcontroller to allow read-only access to the first logical unit; and verifying that the copy is identical to the set of files.

Additional embodiments described herein provide a media storage device comprising: a non-volatile memory comprising a first logical unit with a first partition and a second partition and a second logical unit with a third partition; and a microcontroller communicatively coupled to the memory, wherein the microcontroller is configured to permit read-only access to the first logical unit and read-write access to the second logical unit and wherein the microcontroller is configured to present the media storage device as a fixed disc when the media storage device is accessed; and wherein the first partition comprises a first file system and the second partition comprises a second file system that is different from the first file system.

Other features and advantages of the present invention will become more readily apparent to those of ordinary skill in the art after reviewing the following detailed description and accompanying drawings.

BRIEF DESCRIPTION OF THE DRAWINGS

Certain embodiments are shown in the drawings. However, it is understood that the present disclosure is not limited to the arrangements and instrumentality shown in the attached drawings.

DETAILED DESCRIPTION

Figure 1:
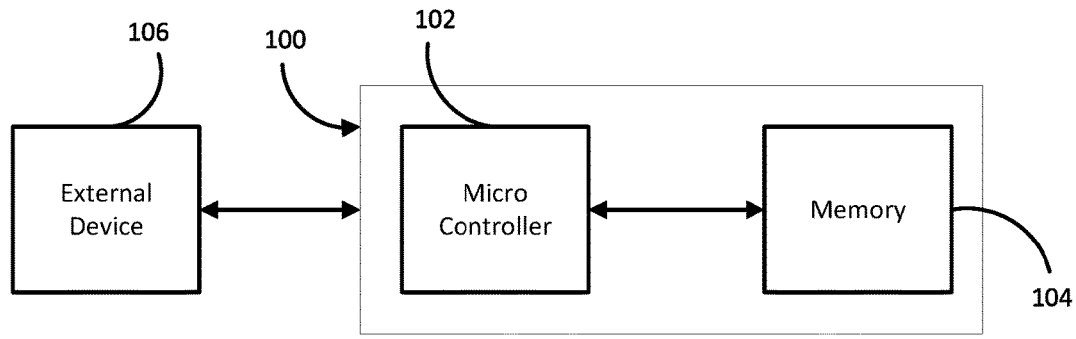
FIG. 1 depicts a schematic representation of a media storage device.

For the purposes of promoting and understanding the principles disclosed herein, reference is now made to the preferred embodiments illustrated in the drawings, and specific language is used to describe the same. It is nevertheless understood that no limitation of the scope of the invention is hereby intended. Such alterations and further modifications in the illustrated devices and such further applications of the principles disclosed and illustrated herein are contemplated as would normally occur to one of skill in the art to which this disclosure relates.

FIG. 1 depicts a media storage device 100 connected to a separate external device 106. By way of example, the media storage device 100 may include a port (such as a male USB type-A plug) while the external device 106 includes a corresponding port (such as a female USB type-A plug). In alternative embodiments, the external device 106 and media storage device 100 may be connected by other means that will be clear to one of skill in the art, including but not limited to USB type-C plugs, micro-USB plugs, Lightning® connectors, or another wired or wireless interface. The media storage device 100 comprises a microcontroller 102 and a memory 104. The microcontroller 102 interacts with an external device 106 and the memory 104 to allow the transfer and execution of media from the media storage device 100 to the external device 106. The microcontroller 102 manages the location where files are stored in the memory 104, and how and when the files are stored and retrieved from the memory 104. The memory 104 can be any known type of non-volatile memory, including but not limited to flash memory including NAND or NOR flash memory. The microcontroller 102 interacts with the memory 104 to structure the memory 104 into a predefined file structure.

To author data to the media storage device 100, the external device 106 may be a general purpose computer comprising a processor, display and input device(s) such as a mouse and keyboard configured with specialized software. In an alternative embodiment, the external device may be a special-purpose computing device specifically configured to author media storage devices 100. The external device 106 interacts with the microcontroller 102 by sending instructions and/or requests to the microcontroller 102. The microcontroller 102 then responds to those instructions and/or requests and accesses the memory 104 as necessary.

To access data on the media storage device 100, the external device 106 queries the microcontroller 102, which in turn accesses the memory 104. The microcontroller 102 thus intermediates all interactions between the external device 106 and the memory 104.

The memory 104 in each media storage device 100 is divided into one or more logical units, each identified by a single logical unit number (LUN). Each logical unit may contain one or more partitions (or volumes). Media storage devices present themselves to external devices as being either removable or non-removable using a removable media bit (RMB). The RMB is coded in the microcontroller 102. In an embodiment, an RMB of zero indicates that a media storage device 100 is not a removable media device, while an RMB of one indicates that a media storage device 100 is a removable media device. A media storage device 100 may also inform an external device 106 whether the media storage device 100 is read only or whether the media storage device 100 may be both read and written too. In an embodiment, this is accomplished through the use of a read-write (R/W) flag.

Portable media storage devices are typically provided to customers with a single logical unit formatted as a single partition. Further, such devices identify themselves as removable drives (e.g., by having an RMB set to 1). For example, by default, the memory 104 of a media storage device 100 is be configured as a single "target" or logical unit, with its LUN set to zero. The logical unit will typically be formatted as a single partition using a single file structure, such as by using the File Allocation Table (FAT) file system architecture and the FAT 32 file system. Typically, operating systems (such as Windows) only permit a single partition (or logical unit) to reside on a removable media storage device 100 (i.e., one with an RMB of 1). Such an operating system is only capable of accessing the first partition or logical unit on a media storage device 100. Problematically, many operating systems (particularly those utilized in special purpose computers, such as those contained in vehicle audio-visual units, game systems, smart televisions and home audio-visual systems) are only able to access a limited number of file structures. Thus, a media storage device 100 that is authored so as to be compatible with one device (e.g., a gaming system) could not be accessed by another device (such as a home audio-visual system).

Figure 2:
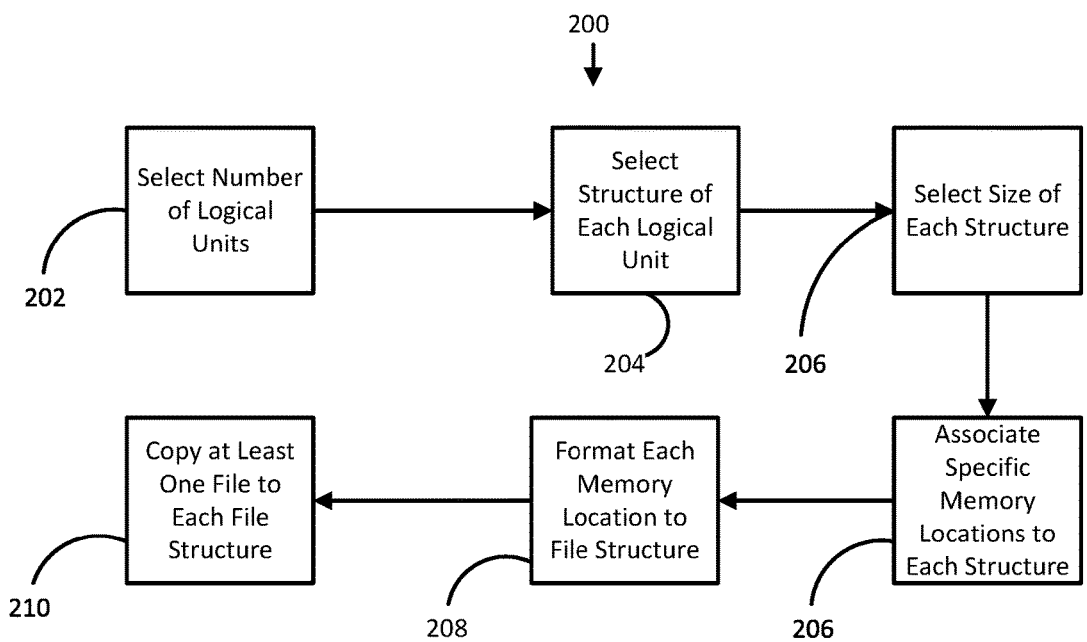
FIG. 2 depicts a schematic representation of a method used to format the media storage device of FIG. 1.

FIG. 2 depicts a schematic representation of the microcontroller 102 configuring the memory 104 to a predetermined file structure. The method begins at step 202, wherein the microcontroller 102 determines the number of logical units to create on the media storage device 100 based on input received from an external device 106. Each logical unit is assigned a unique LUN, with the first logical unit receiving an LUN of zero, the second receiving an LUN of one, and so on. Next, at step 204, the microcontroller 102 selects a partition structure for each logical unit and a file structure for each partition based on input received from the external device 106. For example, a single logical unit may be divided into two separate partitions, each with a distinct file structure. The file structure for each partition may be selected from a list of file structures stored on the microcontroller 102. Alternatively, in an embodiment, the external device 106 provides the microcontroller 102 with information regarding a file structure not previously known to the microcontroller 102, thereby enabling the microcontroller 102 to format a partition with the previously unknown file structure. Advantageously, in an embodiment, the external device 106 may provide the file structure for each logical unit in addition to each partition. The file structures may include, but are not limited to, FAT, the NT file system (NTFS), the extended File Allocation Table (exFAT) file system, the Hierarchical File System Plus (HFS+), the Apple File System (APS), or any other known file structure. Each file structure is configured to allow the files stored in the memory 104 to interact with different external devices 106. The microcontroller 102 may store a listing and format for each file structure in the memory 104 for retrieval at a later time. In another embodiment, an external device 106 provides the file structure to the microcontroller 102 for configuration of the memory 104. Each partition of the memory 104 may be formatted with different file structures to allow the media storage device 100 to interact with different external devices 106. As an illustrative example, the media storage device 100 may format a first partition of LUN zero as an NTFS files structure, a second partition of LUN zero as an FAT file structure and a third partition of LUN one as an APS file structure. In one embodiment, the order and arrangement of the different partitions in the memory does not matter. In another embodiment, the order and arrangement of the different partitions in memory 104 is predetermined.

In step 206, the size of each partition of the memory 104 is determined based on input from the external device 106. In one embodiment, the size of each partition is a fixed amount. In another embodiment, the size of each partition is variable and may be adjusted based on the storage needs of the data stored on the media storage device 100.

In step 208, the microcontroller 102 associates specific memory locations with a specific file structure. In step 210, each memory location is formatted to the predetermined file structure. In step 210, a file is copied to the formatted portions of the memory 104.

Figure 3:
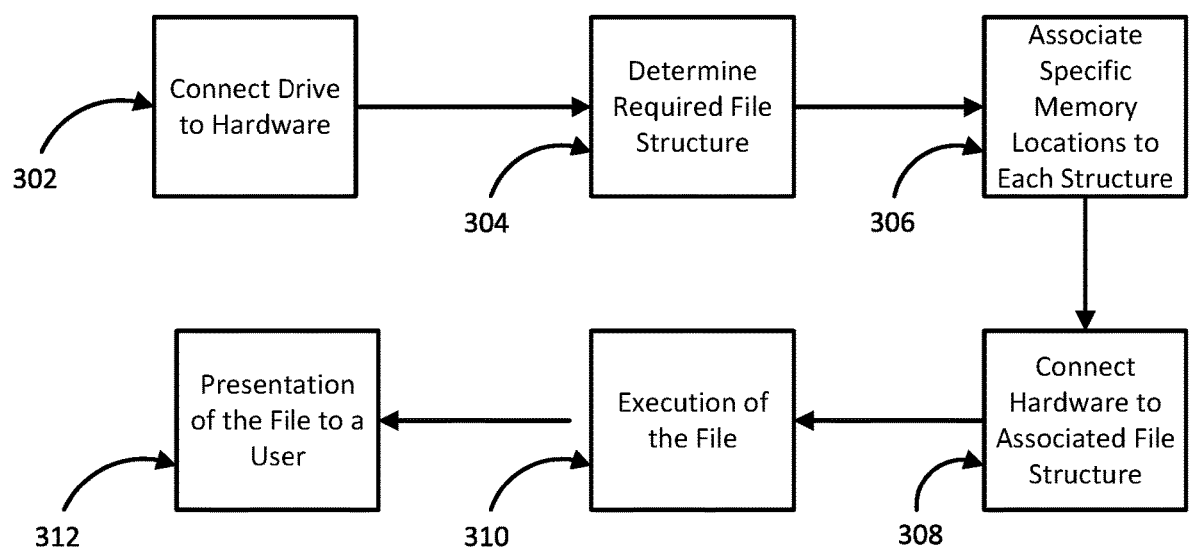
FIG. 3 shows a schematic representation of a method used by the media storage device of FIG. 1 interacting with an external device.

FIG. 3 depicts a schematic representation of the media storage unit 100 interacting with an external device. In step 302, the media storage device 100 is connected to an external device. In step 304, the microcontroller 102 interacts with the external device to determine a file structure for the external device. The microcontroller 102 may request the file structure from the external device to determine the appropriate partition to retrieve the media file. In step 306, the microcontroller 102 determines which partition to associate with the external device based on the file structure of the external device. The microcontroller 102 may also make other configuration changes based on the file structure. As an illustrative example, the microcontroller 102 may adjust different settings sent to the external device to make the media storage device 100 appear to be a fixed drive opposed to removable media to the external device.

In step 308, the external device is connected to the associated memory location in the memory 104 to allow for the execution of the media on either the memory 104 or on the external device. In step 310, the microcontroller 102 executes the files locally on the memory 104 or on the external device. In step 312, the external device presents the media to the user via the external device.

By creating multiple partitions and logical units on a single media storage device 100, the single media storage device 100 can interact with a multitude of external devices of different types. This improves compatibility and avoids the need to author separate media storage devices for each target external device.

Figure 4:
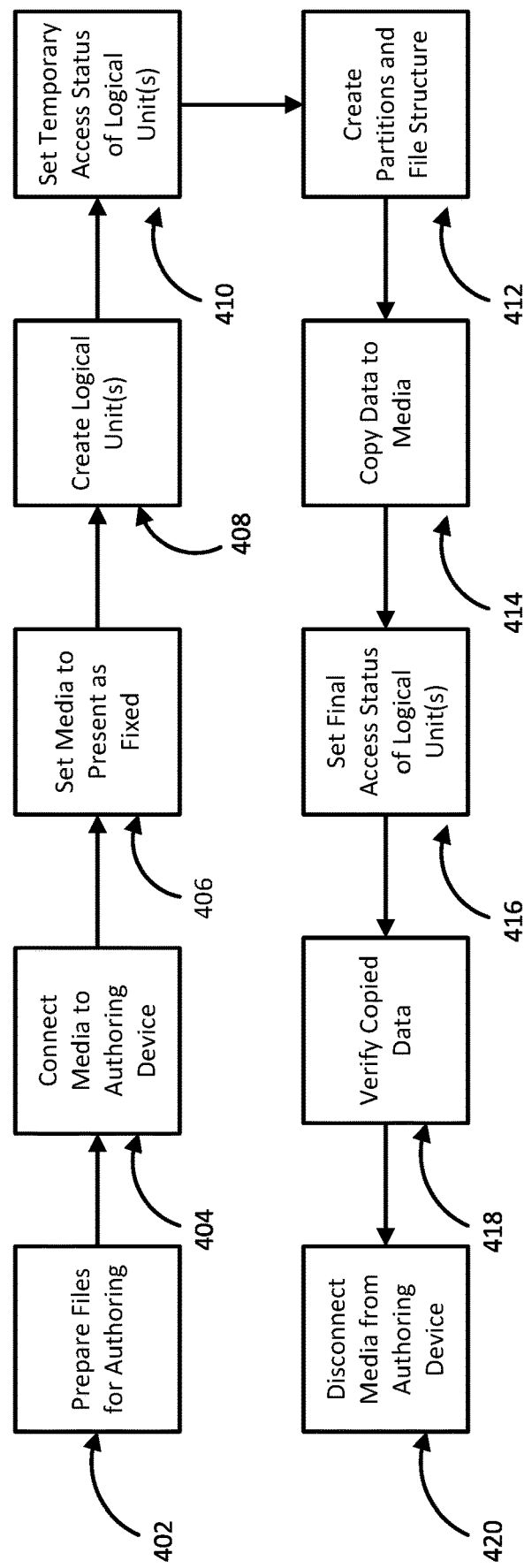
FIG. 4 shows a schematic representation of a method for authoring the media storage device of FIG. 1.

FIG. 4 depicts a schematic representation of a preferred embodiment of a method of authoring a media storage device 100 to be compatible with multiple external devices 106, wherein each external device 106 is a different type of device. The method begins at step 402, when a specialized external device 106 (which may be referred to herein as an "authoring device") configured to author the media storage device 100 determines the specific data file or files to be authored to a media storage device 100 and configures the files for authoring. This determination may be made based on user input, instructions stored locally or instructions received from another device (e.g., using the Internet).

The authoring device may be, by way of illustrative example, a computer running the Linux operating system with specialized software configured to access the microcontroller 102 of a media storage device 100. The one or more data files to be written to the media storage device 100 may comprise audio (such as a song encoded in the MP3 format) audio-video (such as a music video encoded in the MP4 format), images (such as a photograph encoded in the JPG format), text (such as lyrics encoded in the TXT format) or other data types as will be apparent to one of skill in the art. In an embodiment, the one or more data files comprise uncompressed high definition audio and video with related data (such as song lyrics, liner notes, accompanying artwork or subtitle files). In an embodiment, the authoring device converts the one or more data files into format(s) that will be compatible with multiple external devices. As an illustrative example, the data files could be a series of audio files forming individual tracks for a music album. The data files could be provided to the authoring device in a lossless audio format, such as the Free Lossless Audio Codec (FLAC), and the authoring device will then convert the data files into a compatible music format such as the MP3 format. Similar conversions may be used for video, image and other data file types. In an embodiment, the authoring device is programmed with a list of file types that are known to be compatible with the devices with which the media storage device 100 will be used, and all other file types are converted to one of the known-compatible file types so as to maintain the greatest compatibility possible. Once converted (if necessary), the files are arranged into a predetermined folder structure that will be copied to the media storage device. For example, video files may be placed in a folder titled "Video," audio files are placed in a folder titled "Audio," image files are placed in a folder titled "Images," and text or data files are placed in a folder titled "Data."

At step 404, the media storage device 100 is connected to the authoring device such that the external device 106 is communicatively coupled to the microcontroller 102.

At step 406, the microcontroller 102 is instructed to present the media storage device 100 as being a fixed, or non-removable, storage device. In an embodiment, this is accomplished by sending a command from the authoring device to the microcontroller to set the RMB for the media storage device 100 to zero, such that the media storage device 100 will present itself as a non-removable or fixed device. As a result, the media storage device 100 effectively presents itself as though it is mounted as a fixed disc (like a standard hard drive) when accessed, rather than as a removable or portable disc. Each logical unit (and each partition on the logical units) on the media storage device will thus report as if it is an individual fixed disc.

At step 408, the authoring device sends a command to the microcontroller causing the microcontroller 102 to format the memory 104 to have the desired number of logical units. In an embodiment, the microcontroller creates two logical units—LUN zero and LUN one. The first logical unit is formatted to have a predetermined size so as to contain the data file to be written to the media storage device 100. The second logical unit is formatted to contain all of the remaining free space in the memory 104 after creation of the first logical unit.

At step 410, the authoring device sends a command to the microcontroller causing the microcontroller to set a temporary access status for the logical unit(s), such that all logical unit(s) may be both read from and written to. This allows information on the logical units to be accessed and the logical units to be written to by the authoring device during the authoring process. In an embodiment, this is accomplished by sending a command from the authoring device to the microcontroller to set a read/write flag in the microcontroller 102 to "read/write" for each logical unit.

At step 412, the authoring device sends a command to the microcontroller causing the microcontroller 102 to format the logical units in the memory 104 to have the desired number of partitions and desired file structure(s), which are predetermined at or by the authoring device. In an embodiment, each logical unit is formatted with two partitions: a first partition using the FAT32 file structure and a second partition using the NTFS file structure. In an alternative embodiment, the first partition uses the exFAT file structure and a second partition using the FAT32 file structure As will be clear to one of skill in the art, other partition schemes may also be used in alternative embodiments depending on the target devices with which the media storage device 100 is to be used.

At step 414, the authoring device copies the data files to the memory 104. In an embodiment, the data files are copied to the first logical unit, and the second logical unit is left blank. Identical copies of the data files are placed on both the first partition of the first logical unit and the second partition of the first logical unit so as to ensure devices that can only access a single one of the partitions will be able to view the data files. In an alternative embodiment, a first version of the data files (such as uncompressed audio) are copied to the first partition of the first logical unit, while a second version of the data files (such as compressed audio) are copied to the second partition of the first logical unit.

At step 416, the authoring device sends a command to the microcontroller causing the microcontroller 102 to set a final access status for each logical unit. In an embodiment, the first logical unit is set to read only, preventing either users or external devices from modifying the content of the first logical unit. This setting applies to both partitions on the first logical unit, thereby preventing either partition from being modified. In an embodiment, this is accomplished by sending a command from the authoring device to the microcontroller to set a read/write flag in the microcontroller 102 to "read only" for the first logical unit while leaving the access setting for the second logical unit unchanged. The first logical unit is set to read only to prevent the data files from being modified and to prevent external devices 106 from inadvertently adding undesired system or temporary files to the first logical unit when the media storage device 100 is accessed. The second logical unit is left as read/write, enabling users of the media storage device 100 to save files to the second logical unit while preserving the integrity of the information on the first logical unit.

At step 418, the authoring device performs a verification (such as a binary compare or a smart compare) to ensure the contents of the first and second partitions on the first logical unit in memory 104 match the source files on the authoring device. The method ends at step 420 when the media storage device 100 is disconnected from the authoring device.

It is understood that the preceding is merely a detailed description of some examples and embodiments of the present invention and that numerous changes to the disclosed embodiments may be made in accordance with the disclosure made herein without departing from the spirit or scope of the invention. The preceding description, therefore, is not meant to limit the scope of the invention, but rather to provide sufficient disclosure to allow one of ordinary skill in the art to practice the invention without undue burden. It is further understood that the scope of the present invention fully encompasses other embodiments that may become obvious to those skilled in the art and that the scope of the present invention is accordingly limited by nothing other than the appended claims.

What is claimed is:

1. A method for authoring a media device comprising a non-volatile memory communicatively coupled to a microcontroller to be compatible with a plurality of external devices, each of a different type and each configured as an authoring device, the method comprising the steps of:
   determining a set of files to be written to the media device;
   preparing the set of files to be written to the media device;
   setting the microcontroller to present the non-volatile memory as a fixed disk compatible with a certain specific operating system when the media device is communicatively connected to at least one of the authoring devices by sending a command signal from an authoring device to the microcontroller to set a removable media bit (RMB) to zero;
   formatting the non-volatile memory to contain a plurality of logical units, including at least a first logical unit and a second logical unit, the plurality logical units formatted as a single partition using a single file structure;
   wherein the first logical unit is configured to comprise a predetermined amount of the non-volatile memory and the second logical unit comprises the remaining amount of the non-volatile memory; wherein the size of each partition is variable and may be adjusted based on the storage needs of the data to be authored;
   sending a command to the microcontroller from the authoring device causing the microcontroller to set a temporary access status for the logical unit(s)s to allow read/write access to the plurality of logical units;
   formatting each of the plurality of logical units to contain one or more partitions, including at least a first partition on the first logical unit;
   creating a copy of the set of files in at least the first partition of the first logical unit;
   setting the microcontroller to allow read-only access to the first logical unit; and
   verifying that the copy is identical to the set of files.

2. The method of claim 1, further comprising the step of formatting the first logical unit to contain a second partition, wherein the first partition has a first predetermined file system and the second partition has a second predetermined file system, and wherein the first file system is different than the second file system.

3. The method of claim 2, wherein the first predetermined file system is selected to be compatible with a first device of the plurality of external devices and the second predetermined file system is selected to be compatible with a second device of the plurality of external devices and wherein the first device differs from the second device.

4. The method of claim 1, wherein the step of preparing the set of files to be written to the media device comprises determining a first target device from the plurality of external devices, determining a first file type that is compatible with the first target device, and converting one or more of the set of files to the first file type to create a set of compatible files, the method further comprising the steps of
   determining a target file system that is compatible with the first target device;
   formatting the first logical unit to contain a second partition using the target file system; and
   creating a copy of the set of compatible files in at least the second partition of the first logical unit.

5. The method of claim 4, wherein the first partition has a first file system and the target device is not compatible with the first file system.

6. A media storage device comprising:
   a non-volatile memory comprising a first logical unit with a first partition and a second partition configured to comprise a predetermined amount of the non-volatile memory and a second logical unit with a third partition configured with the remaining amount of the non-volatile memory; and
   a plurality of external devices, each of a different type and each configured to act as an authoring device to the media storage device;
   wherein the size of each partition is variable and may be adjusted based on the storage needs of the data to be authored;
   a microcontroller communicatively coupled to the non-volatile memory, wherein the microcontroller is configured to receive a command signal from the authoring device causing the microcontroller to set a temporary access status for the logical unit(s) to permit read-only access to the first logical unit and read-write access to the second logical unit and wherein the microcontroller is configured to present the media storage device as a fixed disc compatible with a certain specific operating system, when the media storage device is accessed, by sending a command signal from an authoring device to the microcontroller to set a removable media bit (RMB) to zero; and wherein the first partition comprises a first file system and the second partition comprises a second file system that is different from the first file system.

7. The media storage device of claim 6, wherein the non-volatile memory comprises flash memory.

8. The media storage device of claim 6, wherein the first file system is compatible with a first device and the second file system is compatible with a second device that is different from the first device.

9. The media storage device of claim 8, wherein the first partition comprises a set of files in a first file format compatible with the first device and the second partition comprises a copy of the set of files in a second file format compatible with the second device that is different from the first file format.

10. The media storage device of claim 8, wherein the first device and the second device are each one of the group consisting of a smart television, a car audio system, a video game system, a home audio system, and a personal computer.

11. The media storage device of claim 6, wherein the first file system and the second file system are each one of the group consisting of FAT32, exFAT, NTFS, HFS+ and AFP.

* * * * *